(12) United States Patent
Lee et al.

(10) Patent No.: US 8,617,910 B2
(45) Date of Patent: Dec. 31, 2013

(54) DISPLAY DEVICE AND A METHOD OF MANUFACTURING THE SAME

(75) Inventors: Jae-Han Lee, Asan-si (KR); Jong-Min Lee, Suwon-si (KR); Sun-Kyu Son, Suwon-si (KR); Young-Il Ban, Hwaseong-si (KR); Ok-Kwon Shin, Asan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 14 days.

(21) Appl. No.: 13/239,822

(22) Filed: Sep. 22, 2011

(65) Prior Publication Data
US 2012/0256199 A1    Oct. 11, 2012

(30) Foreign Application Priority Data
Apr. 7, 2011   (KE) .................. 10-2011-0031971

(51) Int. Cl.
*H01L 21/00*   (2006.01)
*H01L 29/18*   (2006.01)
*H05K 7/00*   (2006.01)

(52) U.S. Cl.
USPC ............. 438/26; 257/88; 257/797; 361/760; 361/767; 361/777

(58) Field of Classification Search
USPC ............................................. 257/88, E33.06
See application file for complete search history.

(56) References Cited

U.S. PATENT DOCUMENTS

| | | | |
|---|---|---|---|
| 7,403,257 B2 * | 7/2008 | Shin et al. ................. | 349/152 |
| 7,580,086 B2 * | 8/2009 | Lee et al. ................... | 349/40 |
| 8,035,238 B2 * | 10/2011 | Kim et al. ................... | 257/797 |
| 2005/0186718 A1 * | 8/2005 | Yoo et al. ................... | 438/151 |

FOREIGN PATENT DOCUMENTS

| | | |
|---|---|---|
| JP | 2008-078552 | 4/2008 |
| KR | 1020060053399 | 5/2006 |
| KR | 1020080001512 | 1/2008 |

* cited by examiner

*Primary Examiner* — Julio J Maldonado
*Assistant Examiner* — Joseph Galvin, III
(74) *Attorney, Agent, or Firm* — F. Chau & Associates, LLC

(57) ABSTRACT

A display device includes an array substrate, a driving film and an adhesive member. The array substrate includes a first base substrate, a plurality of first signal pads formed on the first base substrate and a first dummy pad formed adjacent to the first signal pads. The driving film includes a base film, a plurality of output terminals formed on the base film and a first alignment mark formed adjacent to the output terminals. The adhesive member adheres the first signal pads to the output terminals, and adheres the first dummy pad to the first alignment mark.

20 Claims, 7 Drawing Sheets

DISPLAY DEVICE AND A METHOD OF MANUFACTURING THE SAME

CROSS-REFERENCE TO RELATED APPLICATION

This application claims priority under 35 U.S.C. §119 to Korean Patent Application No. 2011-0031971, filed on Apr. 7, 2011, the disclosure of which is hereby incorporated by reference herein in its entirety.

BACKGROUND OF THE INVENTION

1. Technical Field

Example embodiments of the present invention relate to a display device and a method of manufacturing the display device. More particularly, example embodiments of the present invention relates to a display device including a flat display panel and a method of manufacturing the display device.

2. Description of the Related Art

A display device may include a display pane, a driving part and a printed circuit board (PCB). The display panel includes an array substrate including a plurality of data lines and a plurality of gate lines crossing the data lines formed on a substrate and an opposite substrate positioned opposite to the array substrate. The driving part drives the data lines and the gate lines. The PCB provides electrical signals to the display panel via the driving part.

The driving part may be mounted on the substrate (e.g., COG: Chip On Glass), or may be mounted on a separate film (e.g., COF: Chip On Film). For example, when the driving part is formed in the COF type, eight COFs to fourteen COFs may be used, and then a cost may be increased due to a number of the COFs.

Recently, a technique capable of reducing the number of the COFs by one second (½) or one third (⅓) has been developed. The technique may be very cost-efficient. However, the number of the COFs serving as the connecting part connecting the array substrate and the PCB may be reduced by ½ or ⅓, so that the COFs may be separable from the array substrate by impacts such as, for example, vibrations.

Thus, there is a need in the art for a display device having increased reliability and for a method of manufacturing the same.

SUMMARY OF THE INVENTION

Example embodiments of the present invention provide a display device increased reliability.

Example embodiments of the present invention also provide a method of manufacturing the display device.

According to an example embodiment of the present invention, a display device includes an array substrate, a driving film and an adhesive member. The array substrate includes a first base substrate, a plurality of first signal pads formed on the first base substrate and a first dummy pad formed adjacent to the first signal pads. The driving film includes a base film, a plurality of output terminals formed on the base film and a first alignment mark formed adjacent to the output terminals. The adhesive member adheres the first signal pads to the output terminals, and adheres the first dummy pad to the first alignment mark, respectively.

In an example embodiment, the first dummy pad may be formed outside the first signal pads.

In an example embodiment, the first alignment mark may include alignment portions defining an alignment groove.

The array substrate may further comprise a second alignment mark aligned with the alignment groove. The first dummy pad may adhere to one of the alignment portions.

In an example embodiment, the display device may further comprise a printed circuit board (PCB) electrically connected to the array substrate. The PCB may include a second base substrate, a plurality of second signal pads formed on the second base substrate and a second dummy pad disposed adjacent to the second signal pads.

In an example embodiment, the driving film may include a plurality of input terminals and a third alignment mark. The plurality of input terminals may be spaced apart from the output terminals in a horizontal direction on the base film. The third alignment mark may be disposed adjacent to the input terminals. The second signal pads and the second dummy pad may adhere to the input terminals and the third alignment mark by the adhesive member, respectively.

In an example embodiment, the array substrate may include a plurality of pixel areas. The array substrate may further include a plurality of data lines electrically connected to the first signal pads respectively and a plurality of gate lines crossing the data lines. The pixel areas may include a first side corresponding to a portion of the gate line and a second side corresponding to a portion of the data line. The first side may be longer than the second side.

In an example embodiment, the array substrate may further include a protecting layer and a plurality of transparent electrodes. The protecting layer may be formed on the first base substrate on which the first signal pads are formed, and may include contact holes exposing the first signal pads. The plurality of transparent electrodes may be formed on the protecting layer, and may be electrically connected to the first signal pads via the contact holes, respectively.

In an example embodiment, the first dummy pad may include a same material as the transparent electrode on the protecting layer.

In an example embodiment, the array substrate may further include a protecting layer, an organic layer and a plurality of transparent electrodes. The protecting layer may be formed on the first base substrate on which the first signal pads are formed, and may include first contact holes exposing the first signal pads. The organic layer may be formed on the protecting layer, and may include second contact holes exposing the first signal pads. The plurality of transparent electrodes may be formed on the organic layer, and may be electrically connected to the first signal pads via the first and second contact holes, respectively.

In an example embodiment, the first dummy pad is formed on the organic layer and may include a same material as the transparent electrodes.

According to example embodiment of the present invention, a method of manufacturing a display device is provided. In the method, a plurality of first signal pads and a first dummy pad disposed adjacent to the first signal pads are formed on the first base substrate to form an array substrate. An adhesive is formed on the first signal pads and the first dummy pad. A driving film including a base film, a plurality of output terminals formed on the base film and a first alignment mark formed adjacent to the output terminals is disposed on the array substrate, and the output terminals and the first alignment mark may be adhered to the first signal pads and the first dummy pad, respectively.

In an example embodiment, in forming the array substrate, a plurality of gate lines may be formed on the first base substrate. A gate insulating layer may be formed on the first base substrate on which the gate lines are formed. A plurality of data lines crossing the gate lines and electrically connected to the first signal pads may be formed on the first base substrate on which the gate insulating layer is formed.

In an example embodiment, in forming the array substrate, a protecting layer may be formed on the first base substrate on which the data lines are formed. First contact holes exposing the signal pads may be formed in the protecting layer. A plurality of transparent electrodes electrically connected to the signal pads via the first contact holes respectively and the first dummy pad including a same material as the transparent electrode may be formed on the protecting layer.

In an example embodiment, in forming the array substrate, a protecting layer may be formed on the first base substrate on which the data lines are formed. An organic layer may be formed on the first base substrate on which the protecting layer is formed. First and second contact holes exposing the signal pads may be formed through the protecting layer and the organic layer, respectively. A plurality of transparent electrodes electrically connected to the signal pads respectively via the first and second contact holes and the first dummy pad including a same material as the transparent electrode may be formed on the protecting layer.

In an example embodiment, the array substrate may be divided into a plurality of pixel areas. The pixel areas may have a first side corresponding to a portion of the gate line and a second side corresponding to a portion of the data line. The first side may be longer than the second side.

In an example embodiment, the first alignment mark may include alignment portions defining an alignment groove. In adhering the output terminals and the first alignment mark with the first signal pads and the first dummy pad, respectively, the driving film including the first alignment mark may be disposed on the array substrate including a second alignment mark corresponding to the alignment groove, so that the first alignment mark may be aligned with the second alignment mark.

In an example embodiment, in the method, a printed circuit board including a plurality of second signal pads and a second dummy pad disposed adjacent to the second signal pads may be formed on a second base substrate may be formed. An adhesive may be formed on the second signal pads and the second dummy pad. The driving film may be disposed on the printed circuit board, and a plurality of input terminals opposite to the output terminals on the base film and a third alignment mark adjacent to the input terminals may adhere to the second signal pads and the second dummy pad, respectively to electrically connect the second signal pads to the first base substrate via the driving film.

According to an example embodiment of the present invention, a display device is provided. The display device includes an array substrate including a first base substrate, a plurality of first signal pads and a first alignment mark formed on the first base substrate and a first dummy pad formed outside of the first signal pads and adjacent to the first alignment mark, a printed circuit board (PCB), a driving film formed between the array substrate and the PCB and which electrically connects the array substrate to the PCB. The driving film including a base film including a first overlap area which overlaps the array substrate and a second overlap area spaced apart from the first overlap area and which overlaps the PCB, a plurality of output terminals and a plurality of input terminals formed on the first overlap area and the second overlap area of the base film, respectively, a driving chip disposed between the first and second overlap areas and electrically connected to the output terminals and the input terminals and a second alignment mark formed adjacent to the output terminals in the first overlap area. The display device further includes an adhesive member disposed between the array substrate and the driving film adhering the first signal pads and the first dummy pad of the array substrate to the output terminals and the second alignment mark of the driving film, respectively and disposed between the PCB and the driving film adhering the driving film to the PCB.

According to a display device and a method of manufacturing the same of example embodiments of the present invention, a dummy pad is formed on the array substrate, and the dummy pad adheres to an alignment mark of the driving film, so that the driving film is prevented from separating from the array substrate. Thus, the reliability of the display device may be increased.

In addition, when signal pads are formed on the array substrate, a dummy pad may be simultaneously formed on the array substrate. Thus, the adhesive strength between the driving film and the array substrate may be increased without adding another process.

BRIEF DESCRIPTION OF THE DRAWINGS

Example embodiments of the present invention can be understood in more detail from the following description taken in conjunction with the accompanying drawings, in which.

DETAILED DESCRIPTION OF EXEMPLARY EMBODIMENTS OF THE INVENTION

Hereinafter, exemplary embodiments of the present invention will be explained in detail with reference to the accompanying drawings.

Figure 1:
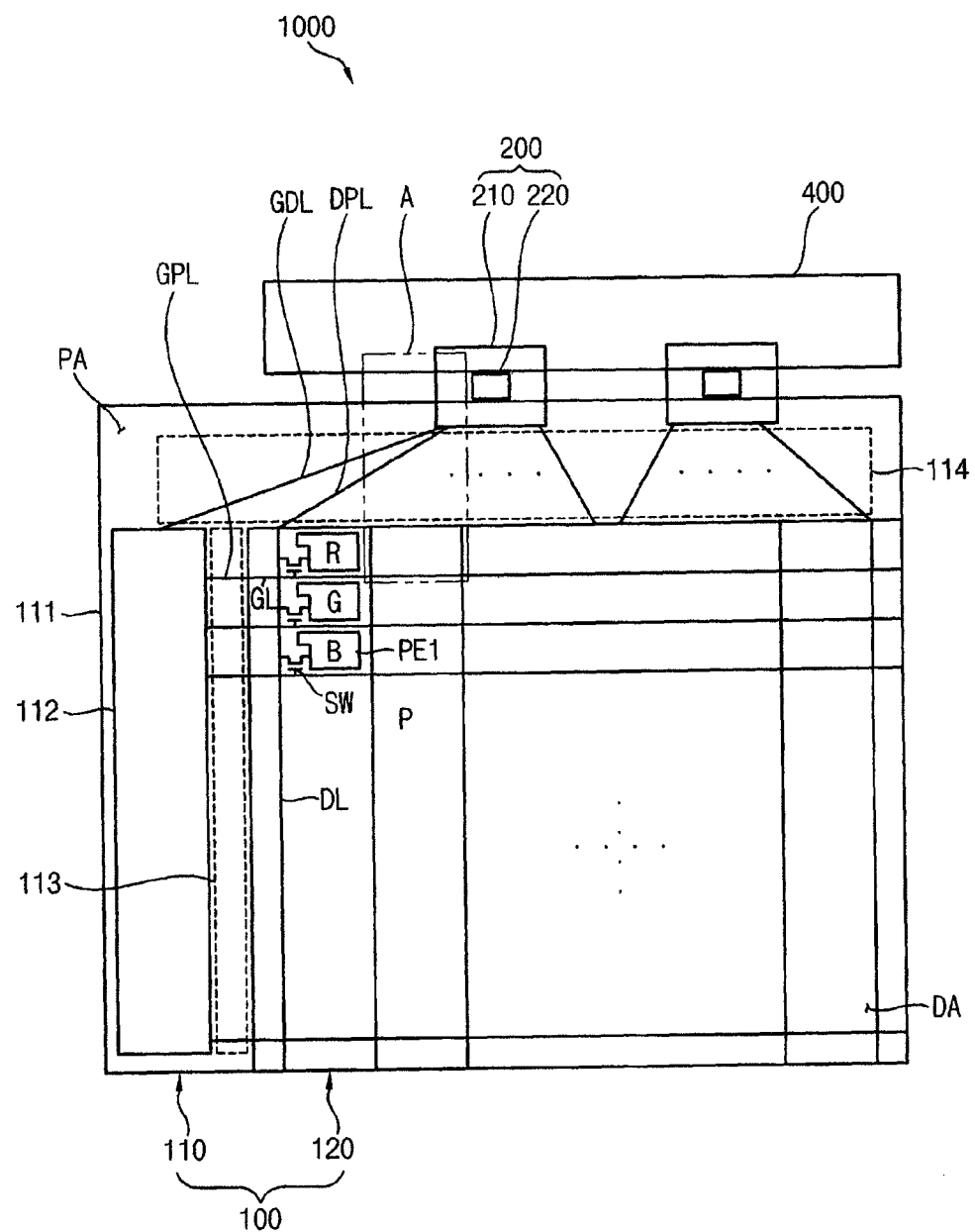
FIG. 1 is a plan view illustrating a display device according to an example embodiment of the present invention.
Figure 2:
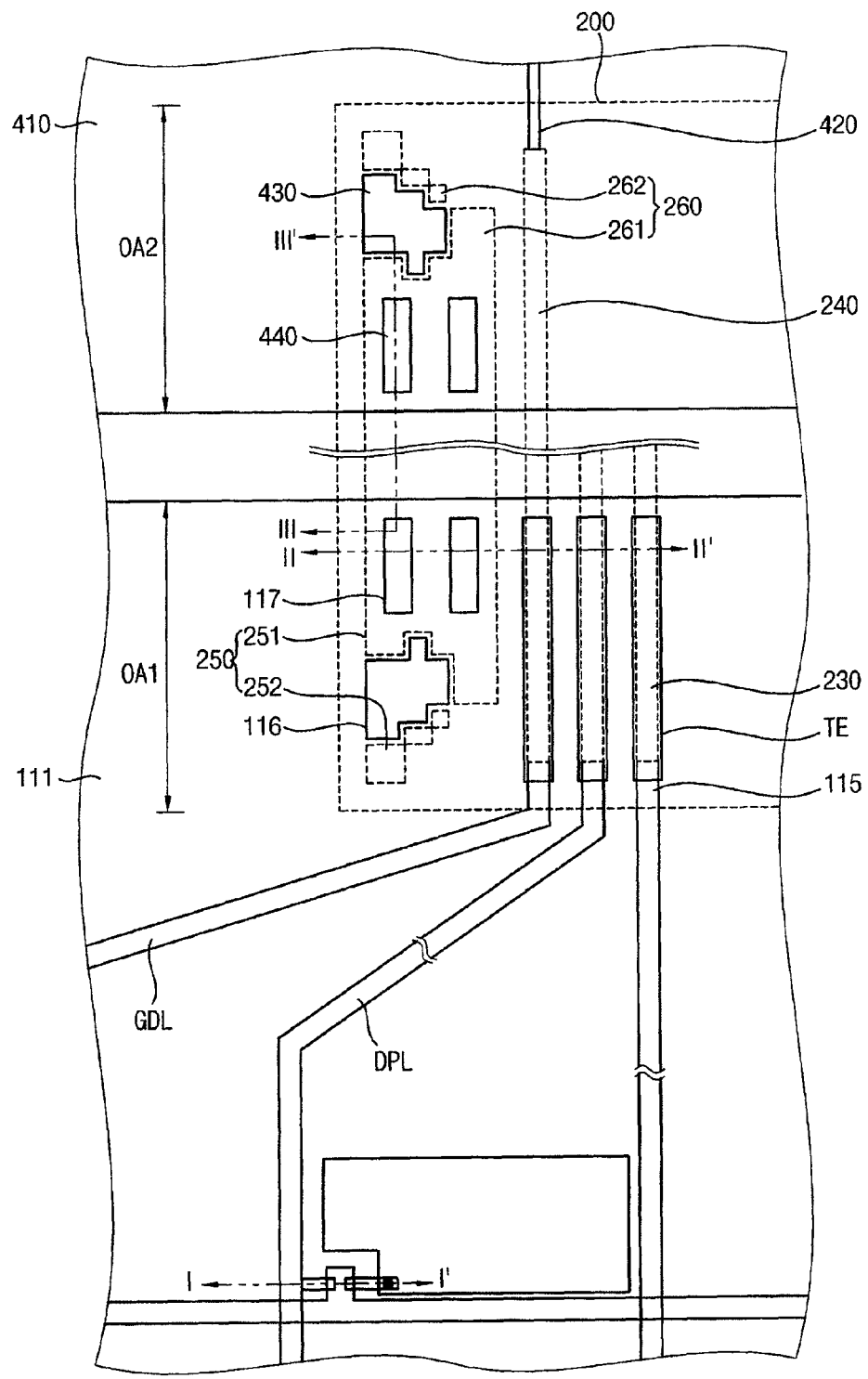
FIG. 2 is an exploded plan view of 'A' portion of FIG. 1.

FIG. 1 is a plan view illustrating a display device according to an example embodiment of the present invention. FIG. 2 is an exploded plan view of 'A' portion of FIG. 1.

Referring to FIGS. 1 and 2, a display device 1000 includes, for example, a display panel 100, a driving film 200 and an adhesive member 300. The display device 1000 may further include a print circuit board (PCB) 400. The display panel 100 includes an array substrate 110, an opposite substrate 120 facing to the array substrate 110 and a liquid crystal layer (not shown) between the array substrate 110 and the opposite substrate 120.

The array substrate 110 is divided into a display area DA overlapping the opposite substrate 120 and displaying an image and a peripheral area PA surrounding the display area DA. The array substrate 110 includes, for example, a first base substrate 111, a gate line GL, a data line DL, a switching element SW, a pixel electrode PE1, a gate driver 112, a gate fan-out part 113, a data fan-out part 114, a first signal pad 115, a first alignment mark 116 and a dummy pad 117.

For example, the gate line GL, the data line DL, the switching element SW and the pixel electrode PE1 are formed in the display area DA of the array substrate 110. The gate line GL extends in a first direction D1 and arranges in a second direction D2 crossing the first direction D1 in parallel. The data line DL extends in the second direction D2 and arranges in the first direction D2 in parallel. It is noted that example embodiments of the present invention are not limited to the above-mentioned positions for the gate lines GL and data lines DL. Alternatively, for example, the data line DL may extend the first direction D1 and be arranged in the second direction D2 crossing the first direction D1 in parallel and the gate line GL may extend in the second direction D2 and be arranged in the first direction D2 in parallel.

The switching element SW includes a gate electrode electrically connected to the gate line GL, a source electrode electrically connected to the data line DL and a drain electrode spaced apart from the source electrode and electrically connected to the pixel electrode PE1.

Adjacent gate lines GL to each other of the gate lines GL and adjacent data lines DL to each other of the data lines DL may define a pixel area P. The pixel area P may include a first side and a second side shorter than the first side. The display device 1000 according to the present example embodiment of FIG. 1 has a structure in which a distance between the adjacent gate lines GL to each other is narrower than that between the adjacent data lines DL. Thus, the first sides of the pixel area P which are relatively long sides are the gate lines GL between the adjacent data lines DL, and the second sides of the pixel area P which are relatively short sides are the data lines DL between the adjacent gate lines GL. It is noted that example embodiments of the present invention are not limited to above structure but rather, for example, alternatively, the distance between the adjacent gate lines GL may be wider than the distance between the adjacent data lines DL.

The display device 1000 according to the present example embodiment of FIG. 1 may have more gate lines GL and less data lines DL than those of a display device having a structure that a distance between the adjacent gate lines GL to each other is wider than that between the adjacent data lines DL. For example, the display device 1000 according to the present example embodiment of FIG. 1 includes two driving films 200 and the two driving films 200 include driving chips respectively, so that a number of the gate lines GL may be 1080×3, and the number of the data lines DL may be 1920. Alternatively, for example, the display device includes one driving film and the driving film includes a driving chip, so that the number of the gate lines GL may be 768×3, and the number of the data lines DL may be 1368. It is noted that example embodiments of the present invention are not limited to the above mentioned numbers for gate lines GL and data lines DL in the display device 1000 but rather, alternatively, for example, the number of data lines DL may be greater than the number of gate lines GL.

The gate driver 112, the gate fan-out part 113, the data fan-out part 114, the first signal pad 115, the first alignment mark 116 and the dummy pad 117 are formed in the peripheral area PA.

The gate driver 112 may be directly mounted on the first base substrate 111.

The gate fan-out part 113 includes a gate fan-out line GPL. The gate fan-out line GPL is formed between the gate line GL and the gate driver 112, and electrically connects the gate line GL to the gate driver 112. The gate driver 112 may sequentially drive the gate line GL.

The data fan-out part 113 includes a data fan-out line DPL and at least one gate driving line GDL. The data fan-out line DPL is formed between the data line DL and the driving film 200, and electrically connects the data line DL to the driving film 200. The driving film 200 may provide an image signal to the data line DL.

The gate driving line GDL is formed between the gate driver 112 and the driving film 200 and is electrically connected to the gate driver 112. The gate driving line GDL may provide a gate start signal, a gate driving signal a horizontal synchronization signal, etc.

The first signal pads 115 is electrically connected to the data fan-out lines DPL and the gate driving line GDL, and is formed in parallel to each other. The first signal pad 115 electrically connected to the data fan-out line DPL of the first signal pads 115 receives a data signal provided from the PCB 400 via the driving film 200, and provides the data signal to the data line DL.

The first alignment mark 116 may be formed outside the first signal pads 115. The first alignment mark 116 is aligned with a second alignment mark 250 of the driving film 200 to align the first signal pads 115 and outer terminals 230 of the driving film 200.

The first dummy pad 117 may be formed outside the first signal pads 115 and adjacent to the first alignment mark 116. The first dummy pad 117 may be formed outside the first signal pads 115 and in parallel to the first signal pads 115. The number of the first dummy pad 117 may be at least one.

When the number of the first dummy pad 117 is one, a width of the first dummy pad 117 may be equal to or smaller than that of the second alignment mark 250 of the driving film 200. Alternatively, there is a plurality of the first dummy pads 117. When there is a plurality of the first dummy pads 117, the width of the first dummy pad 117 may be smaller than that of the second alignment mark 250 of the driving film 200. When there is a plurality of the first dummy pads 117, the conductive ball of the adhesive member 300 interposed between the first dummy pad 117 and the second alignment mark 250 of the driving film 200 may move between the adjacent first dummy pads 117, so that the adhesive strength between the first dummy pad 117 and the second alignment mark 250 of the driving film 200 may be increased.

When there is a plurality of the first dummy pads 117, a pitch between the adjacent first dummy pads 117 to each other may be in a range of, for example, about 50 μm to about 100 μm. For example, the pitch between the adjacent first dummy pads 117 to each other may be in the range of about 70 μm to about 80 μm.

For example, when the pitch between the adjacent first dummy pads 117 to each other is about 70 μm, a width of the first dummy pad 117 may be about 35 μm and a distance between the adjacent first dummy pads 117 to each other may be about 35 μm. For another example, when the pitch between the adjacent first dummy pads 117 to each other is about 80 μm, the width of the first dummy pad 117 may be about 40 μm and the distance between the adjacent first dummy pads 117 to each other may be about 40 μm.

Alternatively, the first dummy pad 117 may not be parallel to the first signal pads 115. Instead, the first dummy pad 117 may have various shapes to adhere to the second alignment pad 250 of the driving film 200.

Thus, the first dummy pad 117 adheres to the second alignment mark 250 of the driving film 200 formed outside the first signal pads 115, so that the adhesive strength between the array substrate 110 and the driving film 200 may be increased.

Figure 3A:
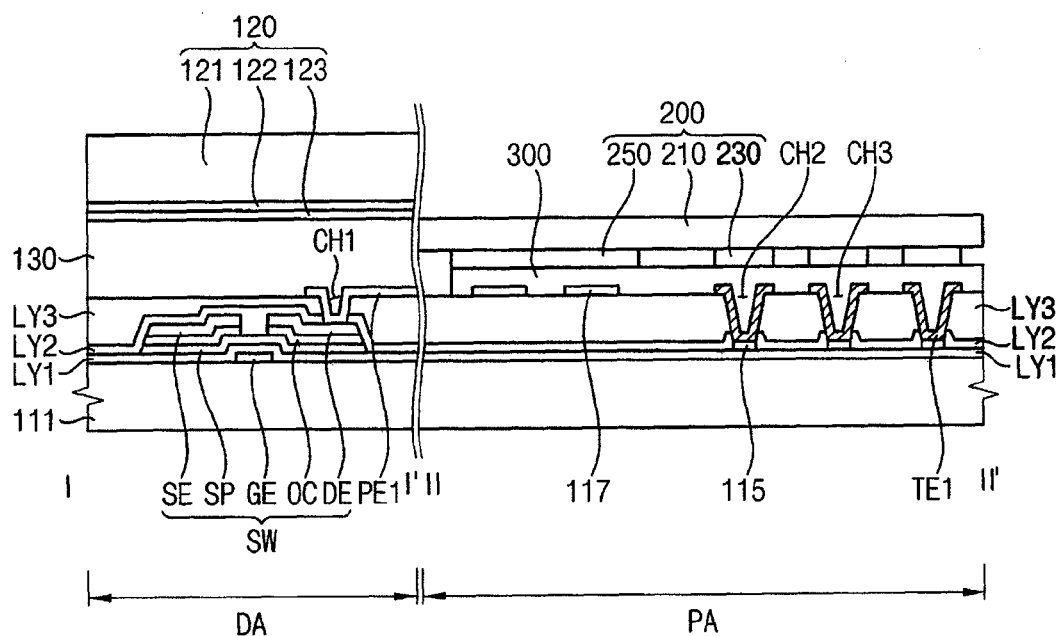
FIG. 3A is a cross-sectional view taken along a line I-I' and a line II-II' of FIG. 2.

FIG. 3A is a cross-sectional view taken along a line I-I' and a line II-II' of FIG. 2.

Referring to FIGS. 2 and 3A, the array substrate 110 further includes, for example, a gate insulating layer LY1, a protecting layer LY2, an organic layer LY3 and a transparent electrode TE1.

The gate insulating layer LY1 is formed on the first base substrate 111 having the gate electrode GE and the gate line GL, and insulates the gate line GL and the data line DL.

The protecting layer LY2 is formed on the gate insulating layer LY1 having the switching element SW in the display area DA and the signal pads 115 in the peripheral area PA, and protects the switching element SW.

The organic layer LY3 is formed on the protecting layer LY2, makes the array substrate 110 flat, and uniformly maintains a cell gap between the array substrate 110 and the opposite substrate 120.

A first contact hole CH1 is formed in the organic layer LY3 in the display area DA, so that the pixel electrode PE1 is electrically connected to the drain electrode DE via the first contact hole CH1. A second contact hole CH2 and a third contact hole CH3 are formed in the protecting layer LY2 and the organic layer LY3 in the peripheral area PA, so that the transparent electrodes TE1 are electrically connected to the signal pads 115 via the second and third contact holes CH2 and CH3.

The transparent electrode TE1 is formed on the signal pads 115 exposed by the second and third contact holes CH2 and CH3 and the organic layer LY3 to increase physical adhesion areas and electrical contact areas between the output terminal 230 and the signal pads 115.

The first dummy pad 117 is formed outside the signal pads 115 on the organic layer LY3 and disposed adjacent to the signal pads 115. Alternatively, the first dummy pad 117 may be formed on another region of the first base substrate 111 instead of the organic layer LY3 such as, for example, the protecting layer LY2.

The opposite substrate 120 may include, for example, a second base substrate 121, a color filter layer 122 formed on the second substrate and displaying red, green and blue colors, a common electrode layer 123 formed on the color filter layer 122 and facing the pixel electrode PE1.

The driving film 200 may include, for example, a base film 210, a driving chip 220, an output terminal 230, an input terminal 240 and a second alignment mark 250.

The driving film 200 is disposed between the array substrate 110 and the PCB 400, and electrically connects the array substrate 110 to the PCB 400. The driving film 200 may provide, for example, a timing control signal, a gamma voltage signal, a gate control signal, a data control signal, from the PCB 400 to the array substrate 110.

The base film 210 may include a material having small thermal expansive coefficient and outstanding elasticity. For example, the base film 210 may include one of polyimide, acrylic, polyether nitrile, polyether sulfone, polyethylene terephthalate, polyethylene naphthalate and polyvinyl chloride. The base film 210 includes the material having the outstanding elasticity, so that the base film 210 may not need other slits used for bending for itself. Thus, a manufacturing process may be simplified.

In addition, the base film 210 may not need another opening of mounting the driving chip 220, so that the widths of the output terminals 230 and the input terminals 240 may be minimized.

The base film 210 may be divided into a first overlap area OA1 overlapping the array substrate 110 and a second overlap area OA2 spaced apart from the first overlap area OA1 and overlapping the PCB 400. The driving chip 220 may be disposed between the first and second overlap areas OA1 and OA2. The driving chip 220 is electrically connected to the output terminals 230 and the input terminals 240.

The output terminals 230 include, for example, copper (Cu) or Cu alloys. It is also noted that the output terminals may also be formed of other conductive materials or metals such as, for example, aluminum (Al) or Al alloys, or silver (Ag) or Ag alloys. The output terminals 230 are formed, for example, in the first overlap area OA1 on the base film 210 in parallel to each other. The output terminals 230 correspond to the first signal pads 115, respectively, so that the output terminals 230 overlap the first signal pads 115 respectively when the first overlap area OA1 of the driving film 200 overlap the array substrate 110. Thus, the output terminals 230 may adhere to the first signal pads 115 by the adhesion member 300, respectively.

The output terminals 230 may provide signals provided from the driving chip 220 to the data line DL and the gate driver 112.

The input terminals 240 include, for example, Cu or Cu alloys. It is also noted that the input terminals 240 may also be formed of other conductive materials or metals such as, for example, aluminum (Al) or Al alloys, or silver (Ag) or Ag alloys. The input terminals 240 are formed, for example, in the second overlap area OA2 on the base film 210 in parallel to each other, and face to the output terminals 230. The input terminals 240 correspond to the second signal pads 420 of the PCB 400, so that the input terminals 240 overlap the second signal pads 420 when the second overlap area OA2 of the driving film 200 overlaps the PCB 400. Thus, the input terminals 240 may adhere to the second signal pads 420 by the adhesive member 300, respectively.

The input terminal 240 may provide the signals provided from the PCB 400 to the driving chip 220.

The second alignment mark 250 is formed outside the output terminals 230 in the first overlap area OA1. The second alignment mark 250 includes at least one alignment portion, and the alignment portion may define an alignment groove. For example, referring to FIG. 2, when there are two alignment portions, the two alignment portions may define the alignment groove for aligning the first alignment mark 116. The first alignment mark 116 of the array substrate 110 is aligned with the second alignment mark 250 of the driving film 200, so that the array substrate 110 may be aligned with the driving film 200.

The first dummy pad 117 formed outside the first signal pads 115 and adjacent to the first alignment mark 116 may adhere to at least one of the alignment portions 251 and 252 of the second alignment mark 250.

The adhesive member 300 may be, for example, anisotropic conductive film (ACF) or anisotropic conductive paste (ACP). Example embodiments of the present invention are not limited to the above mentioned materials for the adhesive member 300 but rather the adhesive member 300 may include other adhesives known in the art such as, for example, non-conductive films (NCF) or non-conductive paste (NCP). In the present embodiment, the adhesive member 300 includes, for example, a conductive ball in an adhesive material. The adhesive member 300 is disposed between the array substrate 110 and the driving film 200 to adhere the driving film 200 to the array substrate 110. For example, the adhesive member 300 is disposed on the first signal pads 115 and the first dummy pad 117 of the array substrate 110 to adhere the output terminals 230 and the second alignment mark 250 of the driving film 200 to the first signal pads 115 and the first dummy pad 117 of the array substrate 110 respectively. The adhesive member 300 may physically adhere the first signal pads 115 to the output terminals 230, while the adhesive member 300 electrically connects the first signal pads 115 to the output terminals 230 by the conductive ball.

Figure 3B:
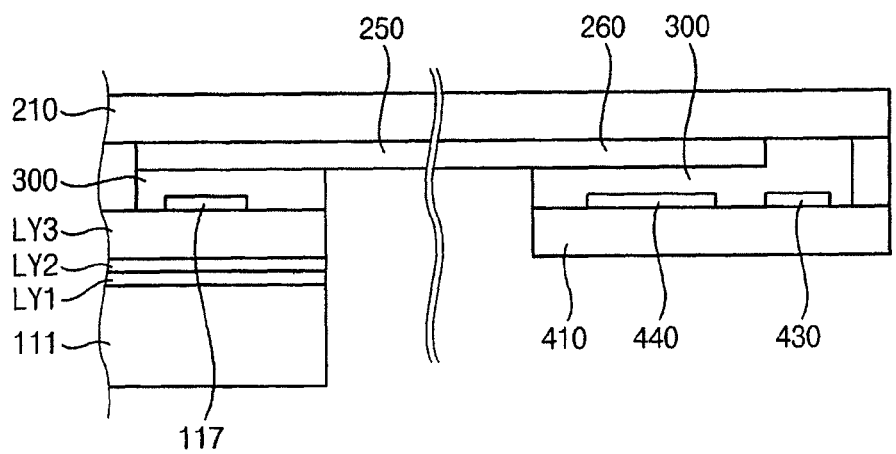
FIG. 3B is a cross-sectional view taken along a line III-III' of FIG. 2.

FIG. 3B is a cross-sectional view taken along a line III-III' of FIG. 2.

Referring to FIGS. 2 and 3B, the PCB 400 includes, for example, a third base substrate 410, a second signal pad 420, a third alignment mark 430 and a second dummy pad 440. The PCB 400 provides the signals provided from an external device to the array substrate 110 via the driving film 200.

The second signal pads 420 are formed on the third base substrate 410 in parallel to each other. The third alignment mark 430 and the second dummy pad 440 are formed outside the second signal pads 420. The second dummy pad 440 is formed adjacent to the third alignment mark 430.

In addition, the driving film 200 may further comprise, for example, a fourth alignment mark 260 aligning with the third alignment mark 430 of the PCB 400, a protecting layer disposed on the output terminals 230 and the input terminals 240 and protecting the output terminals 230 and the input terminals 240 and an insulating resin filled between the base film 210 and the driving chip 220 and protecting the driving chip 220 from an external impact. The fourth alignment mark 260 is formed outside the input terminals 240 in the second overlap area OA2 of the driving film 200. The fourth alignment mark 260 may include at least one alignment portion, and the alignment portion may define an alignment groove. For example, referring to FIG. 2, when a number of the alignment portions is two, the alignment portions 261 and 262 may define the alignment groove of aligning the third alignment mark 430 of the PCB 400. The fourth alignment mark 260 of the driving film 200 is aligned with the third alignment mark 430 of the PCB 400, and the driving film 200 may be aligned with the PCB 400.

The second dummy pad 440 formed outside the second signal pads 420 and adjacent to the third alignment mark 430 may adhere one of the alignment portions 261 and 262 of the fourth alignment mark 260 by the adhesive member 300. The adhesive member 300 is disposed between the PCB 400 and the driving film 200 to adhere the driving film 200 to the PCB 400. For example, the adhesive member 300 is disposed on the second signal pad 240 and the second dummy pad 440 to adhere the input terminals 240 and the fourth alignment mark 260 to the second signal pad 420 and the second dummy pad 440 of the PCB 400, respectively.

FIGS. 4A to 4D are cross-sectional views illustrating a method of manufacturing the display device of FIG. 3A.

Figure 4A:
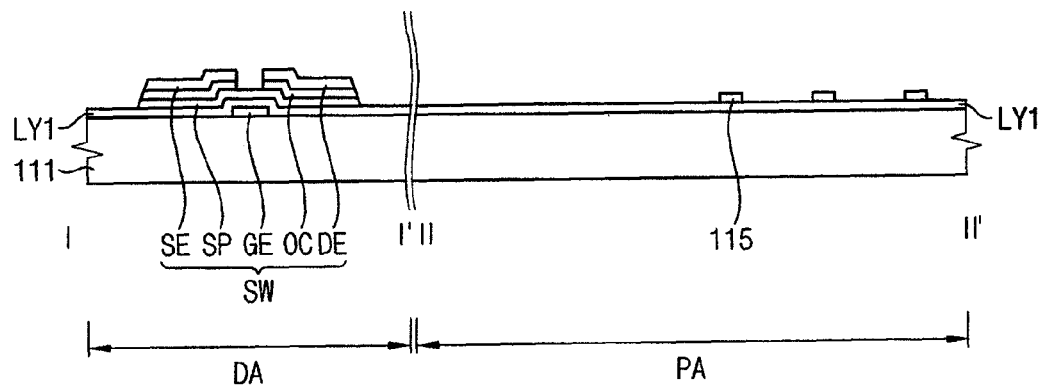
FIGS. 4A to 4D are cross-sectional views illustrating a method of manufacturing the display device of FIG. 3A.

Referring to FIG. 4A, a gate pattern is formed on the base substrate 111. The gate pattern may include, for example, a gate electrode GE, the gate line GL and the gate fan-out line GPL (shown in FIG. 1) and a gate pad and a storage electrode (as not shown). The gate insulating layer LY1 is formed on the first base substrate 111 on which the gate pattern is formed. The semiconductor layer (SP), the ohmic contact layer (OC) and a data pattern are sequentially formed on the first base substrate 111 on which the gate insulating layer LY1 is formed. The data pattern include, for example, the source electrode (SE), a drain electrode DE, the data line DL, the data fan-out line DPL and the gate driving line GDL (shown in FIG. 1) and the signal pad 115 (shown in FIG. 2).

Figure 4B:
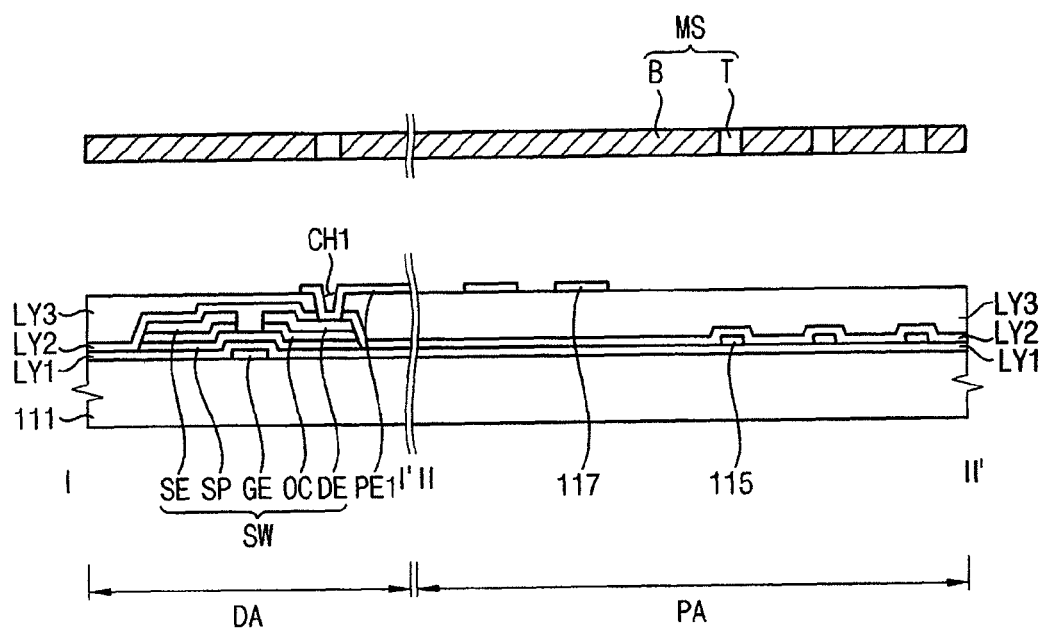

Referring to FIG. 4B, the protecting layer LY2 and the organic layer LY3 are sequentially formed on the first base substrate 111 on which the data pattern is formed. A mask MS including a transmission portion T and a block portion B is disposed over the first base substrate 111 on which the protecting layer LY2 and the organic layer LY3 are formed. When the light is provided to the mask MS, the organic layer LY3 is exposed and developed. The protecting layer LY2 is etched using the organic layer LY3 as a mask.

Figure 4C:
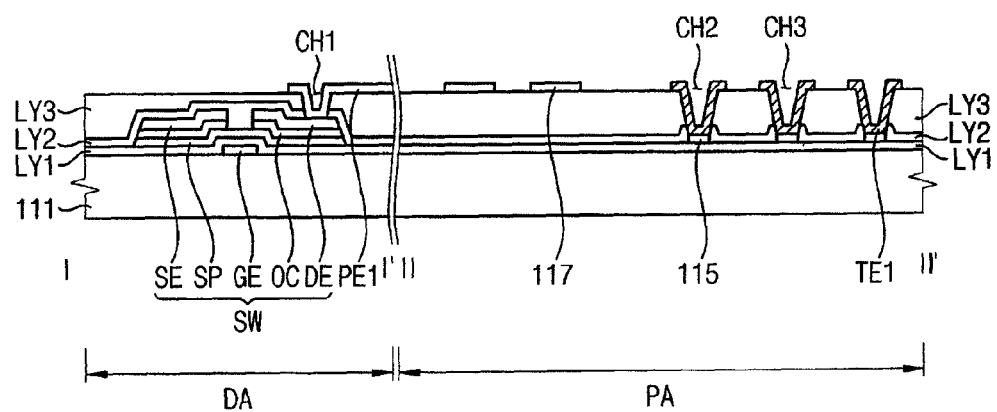

Referring to FIG. 4C, the protecting layer LY2 and the organic layer LY3 corresponding to the transmission portion T are removed, and then the first to third contact holes CH1, CH2 and CH3 are formed in the organic layer LY3 and the protecting layer LY2. The transparent electrode pattern is formed on the first base substrate 111 on which the first to third contact holes CH1, CH2 and CH3 is formed. The transparent pattern includes, for example, a pixel electrode PE1, a transparent electrode TE1 and the first dummy pattern 117.

For example, the pixel electrode PE1 is formed on the organic layer LY3 partially exposing the drain electrode DE through the first contact hole CH1 in the display area DA. The pixel electrode PE1 is electrically connected to the drain electrode DE through the first contact hole CH1. The transparent electrode TE1 is formed on the organic layer LY3 exposing the first signal pads 115 through the second and third contact holes CH2 and CH3 in the peripheral area PA. The transparent electrode TE1 is electrically connected to the first signal pads 115 through the second and third contact holes CH2 and CH3. The first dummy pad 117 is formed outside the signal pads 115 on the organic layer LY3 in the peripheral area PA.

Figure 4D:
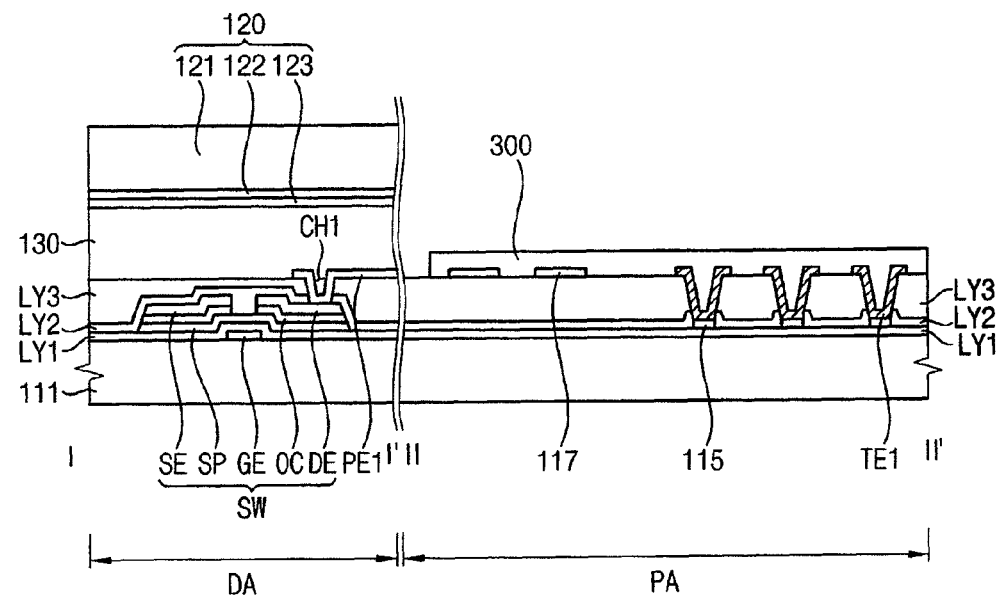

Referring to FIG. 4D, the array substrate 110 including the first base substrate 111 on which the transparent pattern is assembled with the opposite substrate 120. The liquid crystal is injected between the array substrate 110 and the opposite substrate 120 which are assembled with each other, so that the liquid crystal layer is formed therebetween. Alternatively, the liquid crystal is dropped on the array substrate 110 including the first base substrate 111 on which the transparent pattern, and then the array substrate on which the liquid crystal is dropped may be assembled with the opposite substrate 120.

The adhesive member 300 is disposed on the transparent electrode PE1, the first dummy pad 117 and the first alignment mark 116 of the array substrate 110 assembled with the opposite substrate 120.

Referring FIG. 3A again, the driving film 200 is disposed on the array substrate 110 on which the adhesive member 300 is disposed, so that the output terminals 230 face the transparent electrodes TE1, respectively, and the second alignment mark 250 and the alignment groove defined by the alignment portions face to the first dummy pad 117 and the first alignment mark 116, respectively. The driving film 200 is aligned on the array substrate 110 by the first and second alignment marks 116 and 250, while the output terminals 230 adhere to the transparent electrodes TE1, respectively, and the second alignment mark 250 adheres to the first dummy pad 117. The first overlap area OA1 of the driving film 200 adheres to the array substrate 110.

Referring to FIG. 3B again, the adhesive member 300 is disposed on the second signal pad 420, the third alignment mark 430 and the second dummy pad 440 of the PCB 400. The driving film 200 is disposed on the PCB 400 on which the adhesive member 300 is disposed, so that the input terminals 240 face the second signal pad 420, respectively, and the fourth alignment mark 260 and the alignment groove defined the alignment portions of the fourth alignment mark 260 face the second dummy pad 440 and the third alignment mark 430, respectively. The driving film 200 is aligned on the PCB 400 by the third and fourth alignment marks 430 and 260, while the input terminals 240 adhere to the second signal pads 420, respectively, and the fourth alignment mark 260 adheres to the second dummy pad 440. Thus, the second overlap area OA2 of the driving film 200 adheres to the PCB 400.

The display device 1000 according to the present example embodiment of FIG. 1 includes, for example, the first dummy pad 117 formed on the organic layer LY3, and the first dummy pad 117 adheres to the second alignment mark 250 of the driving film 200, so that adhesive strength between the array substrate 110 and the driving film 200 may be increased.

Figure 5A:
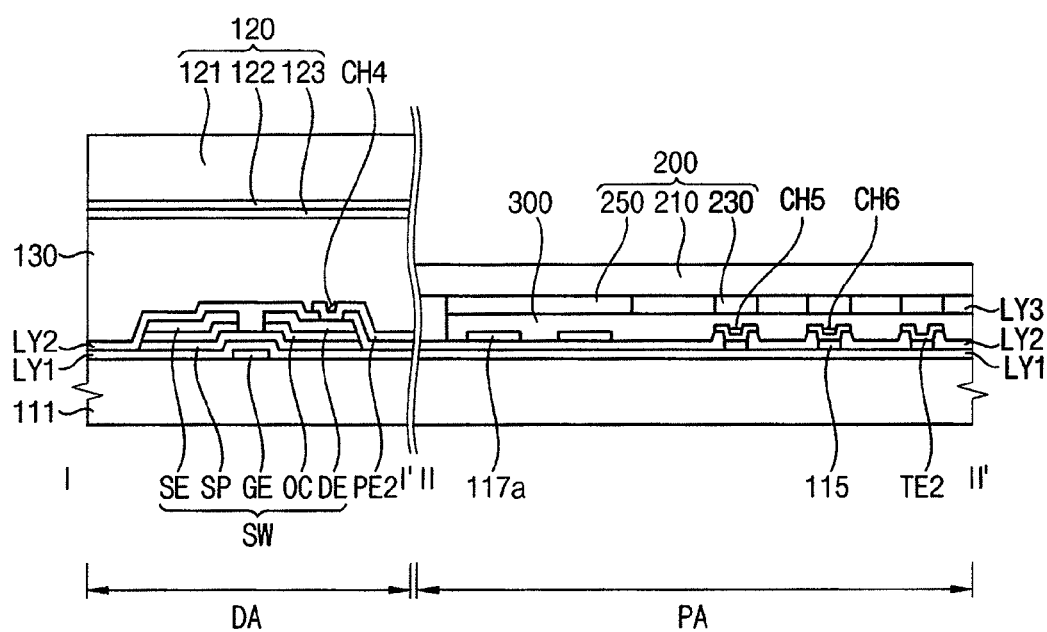
FIG. 5A is a cross-sectional view illustrating a display device according to an example embodiment of the present invention taken along a line I-I' and a line II-II' of FIG. 2.
Figure 5B:
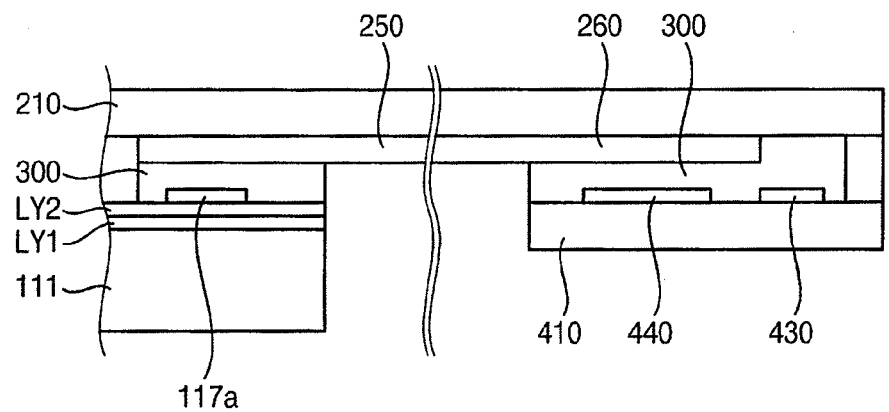
FIG. 5B is a cross-sectional view illustrating a display device according to an example embodiment of the present invention taken along a line III-III' of FIG. 2.

FIG. 5A is a cross-sectional view illustrating a display device according to an example embodiment of the present invention taken along a line I-I' and a line II-IF of FIG. 2. FIG. 5B is a cross-sectional view illustrating a display device according to an example embodiment of the present invention taken along a line of FIG. 2.

The display device according to the present example embodiment in FIGS. 5A and 5B is substantially the same as the display device illustrated in FIG. 1 except for forming a first dummy pad on a protecting layer, and thus the same elements will refer to the display device illustrated in FIG. 1 except for the forming a first dummy pad on a protecting layer.

Referring to FIGS. 5A and 5B, an array substrate 110a further includes, for example, a gate insulating layer LY1, a protecting layer LY2 and a plurality of transparent electrode TE2.

The gate insulating layer LY1 is formed on a first base substrate 111 on which a gate electrode of a switching element SW is formed to insulate the gate electrode GE with a source electrode SE and a drain electrode DE of the switching element SW.

The protecting layer LY2 is formed on the gate insulating layer LY1 on which the switching element SW is formed in the display area DA and the signal pads 115 are foamed in the peripheral area PA, and protects the switching element SW.

A first contact hole CH4 is formed in the protecting layer LY2 formed in the display area DA, and a pixel electrode PE2 is electrically connected to the drain electrode DE through the first contact hole CH4. Second and third contact holes CH5 and CH6 are formed in the protecting layer LY2 formed in the peripheral area PA, transparent electrodes TE2 are electrically connected to the signal pads 115 through the second and third contact holes CH5 and CH5, respectively.

The transparent electrodes TE2 are formed on the signal pads 115 exposed by the second and third contact holes CH5 and CH6 and the protecting layer LY2 to increase a physical contact area and an electrical contact area between the output terminals 230 and the signal pads 115.

The first dummy pad 117a is formed outside the signal pads 115 on the protecting layer LY2, and disposed adjacent to the signal pads 115. For example, the first dummy pad 117a may include a same material with the transparent electrode TE2 on the protecting layer LY2. The transparent electrode TE2 may include, for example, indium-tin-oxide (ITO).

Figure 6A:
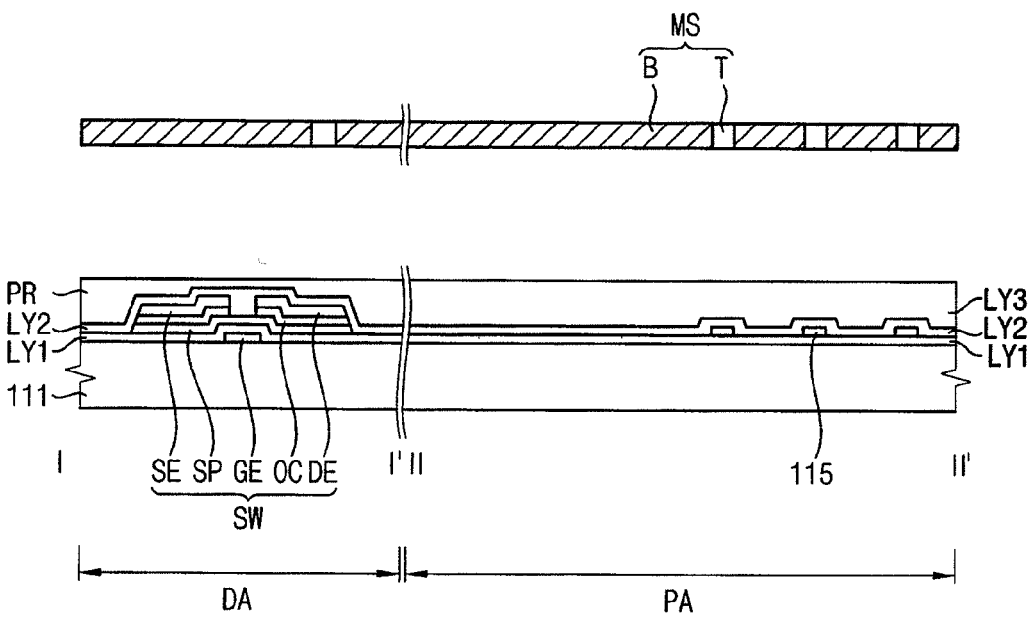
FIGS. 6A and 6B are cross-sectional views illustrating a method of manufacturing the display device of FIGS. 5A and 5B.
Figure 6B:
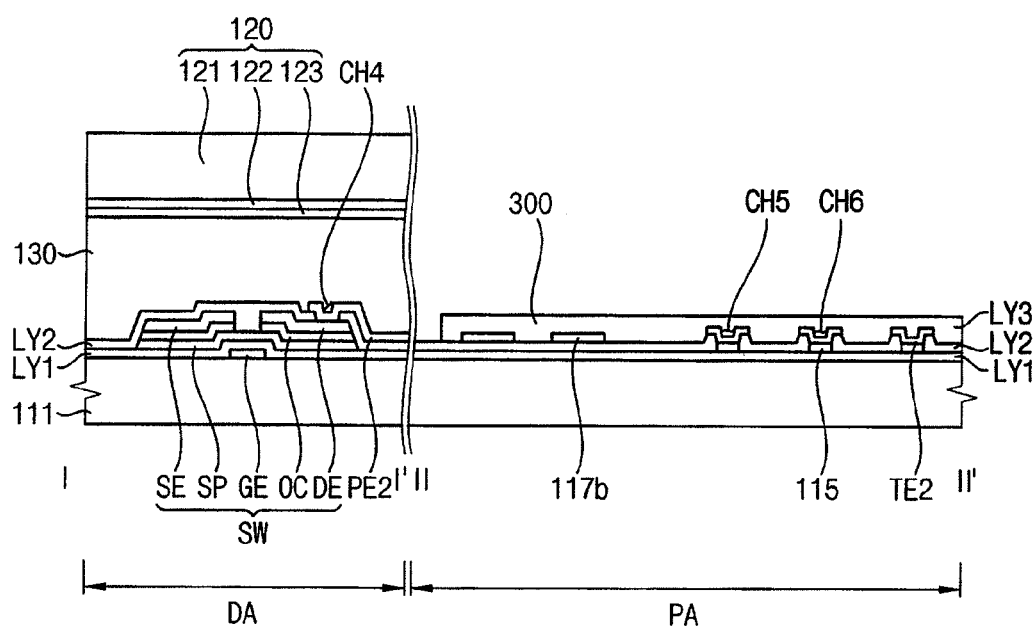

FIGS. 6A and 6B are cross-sectional views illustrating a method of manufacturing the display device of FIGS. 5A and 5B.

Referring to FIGS. 4A and 6B, the protecting layer LY2 and a photoresist layer PR are sequentially formed on the first base substrate 111 on which a data pattern is formed. A mask MS including a transmission portion T and a block portion B is disposed over the first base substrate 111 on which the protecting layer LY2 and the photoresist layer PR. The light is provided to the mask MS, and then the photoresist layer PR is exposed and developed. The protecting layer LY2 is etched using the photoresist layer PR as a mask. The photoresist layer PR is stripped.

Referring to FIG. 6B, the protecting layer LY2 corresponding to the transmission portion T is removed, so that the first to third contact holes CH4, CH5 and CH6 are formed. A transparent electrode pattern is formed on the first base substrate 111 on which the first to third contact holes CH4, CH5 and CH 6 are formed. The transparent electrode pattern includes, for example, the pixel electrode PE2, the transparent electrode TE2 and the first dummy pattern 117b.

For example, the pixel electrode PE2 is foamed on the protecting layer LY2 partially exposing the drain electrode DE through the first contact hole CH4 in the display area DA. The pixel electrode PE2 is electrically connected to the drain electrode DE through the first contact hole CH4. The transparent electrode TE2 is formed on the protecting layer LY2 exposing the signal pads 115 through the second and third contact holes CH5 and CH6 in the peripheral area PA. The transparent electrode TE2 is electrically connected to the signal pad 115 through the second and third contact holes CH5 and CH6. The first dummy pad 117b is formed outside the signal pads 115 on the protecting layer LY2 in the peripheral area PA.

The process that the array substrate 110 including the first base substrate 111 on which the transparent electrode pattern is formed is assembled with the opposite substrate 120 and the process in which the driving film 200 is aligned with and adhered to the array substrate 110 and the PCB 400 are substantially the same as the processes of the method of manufacturing the display device according to FIG. 1. Thus, any repetitive explanation concerning the above processes will be omitted.

The display device according to the present example embodiment of FIGS. 5A and 5B includes the first dummy pad 117a formed on the protecting layer LY2 and the first dummy pad 117a adheres to the second alignment mark 250 of the driving film 200, so that the adhesive strength between the array substrate 110a and the driving film 200 may be increased.

According to example embodiments of the invention, a dummy pad is formed on the array substrate, and the dummy pad adheres to an alignment mark of the driving film, so that the driving film is prevented from separating from the array substrate. Thus, reliability of the display device may be increased.

In addition, when signal pads are formed on the array substrate, a dummy pad may be simultaneously formed on the array substrate. Thus, adhesive strength between the driving film and the array substrate may be increased without adding another process.

Having described example embodiments of the present invention, it is further noted that it is readily apparent to those of reasonable skill in the art that various modifications may be made without departing from the spirit and scope of the invention which is defined by the metes and bounds of the appended claims.

What is claimed is:

1. A display device comprising:
    an array substrate comprising a first base substrate, a plurality of first signal pads disposed on the first base substrate and a first dummy pad disposed adjacent to the first signal pads;
    a driving film comprising a base film, a plurality of output terminals disposed on the base film and a first alignment mark disposed adjacent to the output terminals; and
    an adhesive member adhering the first signal pads and the first dummy pad to the output terminals and the first alignment mark, respectively,
    wherein the first dummy pad overlaps with the first alignment mark, and wherein the first alignment mark includes at least one alignment portion defining an alignment groove on the base film.

2. The display device of claim 1, wherein the first dummy pad is disposed outside the first signal pads.

3. The display device of claim 1, wherein the first alignment mark includes a plurality of alignment portions defining the alignment groove,
wherein the array substrate further comprises a second alignment mark aligned with the alignment groove, and
wherein the first dummy pad adheres to at least one of the alignment portions.

4. The display device of claim 1, further comprising a printed circuit board (PCB) electrically connected to the array substrate, the PCB comprising:
a second base substrate;
a plurality of second signal pads disposed on the second base substrate; and
a second dummy pad disposed adjacent to the second signal pads.

5. The display device of claim 4, wherein the driving film further comprising:
a plurality of input terminals spaced apart from the output terminals in a horizontal direction on the base film; and
a third alignment mark disposed adjacent to the input terminals, and
wherein the second signal pads and the second dummy pad adhere to the input terminals and the third alignment mark by the adhesive member, respectively.

6. The display device of claim 1, wherein the array substrate includes a plurality of pixel areas,
wherein the array substrate further comprising a plurality of data lines electrically connected to the first signal pads respectively and a plurality of gate lines crossing the data lines, and
wherein each of the pixel areas include a first side corresponding to a portion of the gate line and a second side corresponding to a portion of the data line, and the first side is longer than the second side.

7. The display device of claim 1, wherein the array substrate further comprises:
a protecting layer disposed on the first base substrate on which the first signal pads are formed, and including contact holes exposing the first signal pads; and
a plurality of transparent electrodes disposed on the protecting layer, and electrically connected to the first signal pads via the contact holes, respectively.

8. The display device of claim 7, wherein the first dummy pad is disposed on the protecting layer and includes a same material as the transparent electrodes.

9. The display device of claim 1, wherein the array substrate further comprising:
a protecting layer disposed on the first base substrate on which the first signal pads are formed, and including first contact holes exposing the first signal pads;
an organic layer disposed on the protecting layer, and including second contact holes exposing the first signal pads; and
a plurality of transparent electrodes disposed on the organic layer, and electrically connected to the first signal pads via the first and second contact holes, respectively.

10. The display device of claim 9, wherein the first dummy pad is disposed on the organic layer and includes a same material as the transparent electrodes.

11. A method of manufacturing a display device, the method comprising:
forming a plurality of first signal pads and a first dummy pad disposed adjacent to the first signal pads on a first base substrate to form an array substrate;
forming an adhesive on the first signal pads and the first dummy pad; and
disposing a driving film including a base film, a plurality of output terminals formed on the base film and a first alignment mark formed adjacent to the output terminals on the base film, and adhering the output terminals and the first alignment mark to the first signal pads and the first dummy pad, respectively,
wherein the first dummy pad overlaps with the first alignment mark, and wherein the first alignment mark includes at least one alignment portion defining an alignment groove on the driving film.

12. The method of claim 11, wherein the forming of the array substrate comprises:
forming a plurality of gate lines on the first base substrate;
forming a gate insulating layer on the first base substrate on which the gate lines are formed; and
forming a plurality of data lines crossing the gate lines and electrically connected to the first signal pads on the first base substrate on which the gate insulating layer is formed.

13. The method of claim 12, wherein the forming of the array substrate comprises:
forming a protecting layer on the first base substrate on which the data lines are formed;
forming first contact holes in the protecting layer exposing the first signal pads; and
forming a plurality of transparent electrodes and the first dummy pad on the protecting layer, wherein the transparent electrodes are electrically connected to the first signal pads via the first contact holes respectively and wherein the first dummy pad includes a same material as the transparent electrodes.

14. The method of claim 12, wherein the forming of the array substrate comprises:
forming a protecting layer on the first base substrate on which the data lines are formed;
forming an organic layer on the first base substrate on which the protecting layer is formed;
forming a first contact hole and a second contact hole in the organic layer and the protecting layer exposing the signal pads through the protecting layer and the organic layer, respectively; and
forming a plurality of transparent electrodes and the first dummy pad on the organic layer, wherein the transparent electrodes are electrically connected to the signal pads respectively via the first and second contact holes and wherein the first dummy pad includes a same material as the transparent electrodes.

15. The method of claim 12, wherein the array substrate is divided into a plurality of pixel areas, and
wherein each of the pixel areas have a first side corresponding to a portion of the gate line and a second side corresponding to a portion of the data line, and the first side is longer than the second side.

16. The method of claim 11, wherein the first alignment mark includes a plurality of alignment portions defining the alignment groove, and
wherein the adhering of the output terminals and the first alignment mark to the first signal pads and the first dummy pad, respectively comprises:
disposing the driving film including the first alignment mark on the array substrate including a second alignment mark corresponding to the alignment groove, and aligning the first alignment mark with the second alignment mark.

17. The method of claim 11, further comprising:
forming a printed circuit board comprising a plurality of second signal pads and a second dummy pad disposed adjacent to the second signal pads on a second base substrate;
forming an adhesive on the second signal pads and the second dummy pad; and
disposing the driving film on the printed circuit board, and adhering a plurality of input terminals opposite to the output terminals on the base film and a third alignment mark adjacent to the input terminals to the second signal pads and the second dummy pad, respectively to electrically connect the second signal pads to the first base substrate via the driving film.

18. A display device comprising:
an array substrate comprising a first base substrate, a plurality of first signal pads and a first alignment mark disposed on the first base substrate and a first dummy pad disposed outside of the first signal pads and adjacent to the first alignment mark;
a printed circuit board (PCB);
a driving film disposed between the array substrate and the PCB and which electrically connects the array substrate to the PCB, the driving film comprising a base film including a first overlap area which overlaps the array substrate and a second overlap area spaced apart from the first overlap area and which overlaps the PCB, a plurality of output terminals and a plurality of input terminals disposed on the first overlap area and the second overlap area of the base film, respectively, a driving chip disposed between the first and second overlap areas and electrically connected to the output terminals and the input terminals and a second alignment mark disposed adjacent to the output terminals in the first overlap area; and
an adhesive member disposed between the array substrate and the driving film adhering the first signal pads and the first dummy pad of the array substrate to the output terminals and the second alignment mark of the driving film, respectively and disposed between the PCB and the driving film adhering the driving film to the PCB,
wherein the first dummy pad overlaps with the second alignment mark, and wherein the second alignment mark includes at least one alignment portion defining an alignment groove on the driving film.

19. The display device of claim 18, wherein the PCB includes a second base substrate,
a plurality of second signal pads disposed on the second base substrate,
a third alignment mark and a second dummy pad disposed adjacent to the second signal pads.

20. The display device of claim 19, wherein the driving film further includes a fourth alignment mark disposed on the second overlap area of the driving film,
wherein the fourth alignment mark of the driving film is aligned with the third alignment mark of the PCB, and
wherein the adhesive member adheres the input terminals and the fourth alignment mark to the second signal pads and the second dummy pad of the PCB, respectively, thereby adhering the PCB to the driving film.

* * * * *